(12) United States Patent
Fukuzawa et al.

(10) Patent No.: US 7,719,944 B2
(45) Date of Patent: May 18, 2010

(54) METHOD AND APPARATUS FOR RECORDING INFORMATION ON OPTICAL RECORDING MEDIUM WITH COMPENSATION FOR THERMAL EFFECTS IN ULTRA-HIGH-DENSITY OPTICAL RECORDING AND REPRODUCING SYSTEM

(75) Inventors: Narutoshi Fukuzawa, Tokyo (JP); Takashi Kikukawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 727 days.

(21) Appl. No.: 11/522,425

(22) Filed: Sep. 18, 2006

(65) Prior Publication Data
US 2007/0064568 A1    Mar. 22, 2007

(30) Foreign Application Priority Data
Sep. 21, 2005    (JP) .............................. 2005-274784

(51) Int. Cl.
*G11B 7/0045* (2006.01)
(52) U.S. Cl. .................................................. 369/59.12
(58) Field of Classification Search ............... 369/59.12
See application file for complete search history.

(56) References Cited
U.S. PATENT DOCUMENTS
6,791,926 B1 *  9/2004  Shoji et al. ............... 369/53.13
6,829,306 B2 * 12/2004  Immink et al. ............... 375/253
6,982,939 B2 *  1/2006  Powelson et al. ......... 369/47.53
2002/0126604 A1  9/2002  Powelson et al.

FOREIGN PATENT DOCUMENTS
| EP | 1 361 569 A2 | 11/2003 |
| EP | 1 369 850 A1 | 12/2003 |
| JP | A-09-259477 | 10/1997 |
| JP | 2003-6872 | 1/2003 |
| WO | WO 02/17308 A1 | 2/2002 |

* cited by examiner

*Primary Examiner*—Hoa T Nguyen
*Assistant Examiner*—Mark Fischer
(74) *Attorney, Agent, or Firm*—Oliff & Berridge, PLC (57) ABSTRACT

A method for recording information on an optical recording medium in which a laser beam modulated into one or a plurality of write pulses with one or a plurality of write powers in accordance with target data to be written is projected onto a recording layer of the optical recording medium to form a record mark. During recording the information on the optical recording medium, a data level and a weight index are assigned to each channel bit in reference data trains before and after the target data. Recording compensation of the target data is carried out in accordance with the sum totals of the products of the data level and the weight index in the reference data trains, so that it is possible to easily carry out high a real recording by writing fine mark/space trains.

11 Claims, 11 Drawing Sheets

Examples of writing 5T mark (refer to 8T clocks before and after the 5T mark)

| | | +8 | +7 | +6 | +5 | +4 | +3 | +2 | +1 | 0 | 0 | 0 | 0 | 0 | +1 | +2 | +3 | +4 | +5 | +6 | +7 | +8 | Σ in forward reference data train (Weight index * level) | Σ in backward reference data train (Weight index * level) |
|---|---|---|---|---|---|---|---|---|---|---|---|---|---|---|---|---|---|---|---|---|---|---|---|---|
| (A) | Weight index | 0.5 | 0.5 | 0.5 | 0.5 | 1.0 | 1.0 | 1.0 | 1.0 | - | - | - | - | - | 0.5 | 0.5 | 0.5 | 0.5 | 0.5 | 0.25 | 0.25 | 0.25 | -1.0 | -3.0 |
| | NRZI data train | -1 | -1 | -1 | +1 | +1 | +1 | -1 | -1 | | | | | | -1 | -1 | -1 | -1 | -1 | -1 | -1 | -1 | | |
| | level Weight index *level | -0.5 | -0.5 | -0.5 | 0.5 | 1.0 | 1.0 | -1 | -1 | | | | | | -0.5 | -0.5 | -0.5 | -0.5 | -0.5 | -0.25 | -0.25 | -0.25 | | |
| (B) | Weight index | 0.5 | 0.5 | 0.5 | 0.5 | 1.0 | 1.0 | 1.0 | 1.0 | - | - | - | - | - | 0.5 | 0.5 | 0.5 | 0.5 | 0.5 | 0.25 | 0.25 | 0.25 | -2.0 | -1.0 |
| | NRZI data train | +1 | +1 | +1 | +1 | +1 | +1 | -1 | -1 | | | | | | -1 | -1 | +1 | +1 | -1 | -1 | -1 | -1 | | |
| | level Weight index *level | 0.5 | 0.5 | 0.5 | 0.5 | 1.0 | 1.0 | -1 | -1 | | | | | | -0.5 | -0.5 | 0.5 | 0.5 | -0.5 | -0.25 | -0.25 | -0.25 | | |
| (C) | Weight index | 0.3 | 0.3 | 0.5 | 0.7 | 0.7 | 0.8 | 0.9 | 1.0 | - | - | - | - | - | 0.7 | 0.7 | 0.7 | 0.7 | 0.3 | 0.3 | 0.1 | 0.1 | 0.0 | -1.2 |
| | NRZI data train | +1 | +1 | +1 | +1 | +1 | +1 | -1 | -1 | | | | | | -1 | -1 | +1 | +1 | +1 | +1 | +1 | +1 | | |
| | level Weight index *level | 0.3 | 0.3 | 0.5 | 0.7 | 0.7 | 0.8 | -1 | -1 | | | | | | -0.7 | -0.7 | 0.7 | 0.7 | 0.3 | 0.3 | 0.1 | 0.1 | | |
| (D) | Weight index | 0.2 | 0.2 | 0.2 | 0.2 | 1.0 | 1.0 | 1.0 | 1.0 | - | - | - | - | - | 1.0 | 1.0 | 0.5 | 0.5 | 0.5 | 0.5 | 0.5 | 0.5 | -3.6 | -3.0 |
| | NRZI data train | +1 | +1 | +1 | +1 | +1 | +1 | -1 | -1 | | | | | | -1 | -1 | -1 | -1 | -1 | -1 | -1 | -1 | | |
| | level Weight index *level | 0.2 | 0.2 | 0.2 | 0.2 | 1.0 | 1.0 | -1 | -1 | | | | | | -1.0 | -1.0 | -0.5 | -0.5 | -0.5 | -0.5 | -0.5 | -0.5 | | |
| (E) | Weight index | 0.3 | 0.4 | 0.5 | 0.6 | 0.7 | 0.8 | 0.9 | 1.0 | - | - | - | - | - | 1.0 | 0.9 | 0.8 | 0.7 | 0.6 | 0.5 | 0.4 | 0.3 | -1.6 | 1.4 |
| | NRZI data train | -1 | -1 | -1 | -1 | -1 | -1 | -1 | -1 | | | | | | -1 | -1 | +1 | +1 | +1 | +1 | +1 | +1 | | |
| | level Weight index *level | -0.3 | -0.4 | -0.5 | -0.6 | -0.7 | -0.8 | -0.9 | -1 | | | | | | -1 | -0.9 | 0.8 | 0.7 | 0.6 | 0.5 | 0.4 | 0.3 | | |
| (F) | Weight index | 0.3 | 0.4 | 0.5 | 0.6 | 0.7 | 0.8 | 0.9 | 1.0 | - | - | - | - | - | 1.0 | 0.9 | 0.8 | 0.7 | 0.6 | 0.5 | 0.4 | 0.3 | -0.2 | 1.4 |
| | NRZI data train | +1 | +1 | +1 | +1 | +1 | +1 | -1 | -1 | | | | | | -1 | -1 | +1 | +1 | +1 | +1 | +1 | +1 | | |
| | level Weight index *level | 0.3 | 0.4 | 0.5 | 0.6 | 0.7 | 0.8 | -0.9 | -1 | | | | | | -1 | -0.9 | 0.8 | 0.7 | 0.6 | 0.5 | 0.4 | 0.3 | | |

| | | +8 | +7 | +6 | +5 | +4 | +3 | +2 | +1 | 0 | 0 | 0 | +1 | +2 | +3 | +4 | +5 | +6 | +7 | +8 | I in forward reference data train Weight index * level | I in backward reference data train Weight index * level |
|---|---|---|---|---|---|---|---|---|---|---|---|---|---|---|---|---|---|---|---|---|---|---|
| (A) | Weight index NRZI data train | 0.5 | 0.5 | 0.5 | 0.5 | 1.0 | 1.0 | 1.0 | 1.0 | - | - | - | - | 0.5 | 0.5 | 0.5 | 0.25 | 0.25 | 0.25 | 0.25 | -1.0 | -3.0 |
| | level | -1 | -1 | -1 | +1 | +1 | +1 | -1 | -1 | - | - | - | - | -1 | -1 | -1 | -1 | -1 | -1 | -1 | | |
| | Weight index * level | -0.5 | -0.5 | -0.5 | 0.5 | 1 | 1 | -1 | -1 | - | - | - | - | -0.5 | -0.5 | -0.5 | -0.25 | -0.25 | -0.25 | -0.25 | | |
| (B) | Weight index NRZI data train | 0.5 | 0.5 | 0.5 | 0.5 | 1.0 | 1.0 | 1.0 | 1.0 | - | - | - | - | 0.5 | 0.5 | 0.5 | 0.5 | 0.25 | 0.25 | 0.25 | 0.25 | -2.0 | -1.0 |
| | level | +1 | -1 | -1 | +1 | +1 | +1 | -1 | -1 | - | - | - | - | -1 | -1 | -1 | -1 | -1 | -1 | -1 | -1 | | |
| | Weight index * level | 0.5 | -0.5 | -0.5 | 0.5 | 1 | 1 | -1 | -1 | - | - | - | - | -0.5 | -0.5 | -0.5 | -0.5 | -0.25 | -0.25 | -0.25 | -0.25 | | |
| (C) | Weight index NRZI data train | 0.3 | 0.3 | 0.7 | 0.7 | 1.0 | 1.0 | 1.0 | 1.0 | - | - | - | - | 0.7 | 0.7 | 0.7 | 0.7 | 0.3 | 0.3 | 0.1 | 0.1 | 0.0 | -2.0 |
| | level | +1 | +1 | +1 | +1 | +1 | +1 | -1 | -1 | - | - | - | - | -1 | -1 | -1 | -1 | -1 | -1 | -1 | -1 | | |
| | Weight index * level | 0.3 | 0.3 | 0.7 | 0.7 | 1.0 | 1.0 | -1 | -1 | - | - | - | - | -0.7 | -0.7 | -0.7 | -0.7 | -0.3 | -0.3 | -0.1 | -0.1 | | |
| (D) | Weight index NRZI data train | 0.2 | 0.2 | 0.2 | 0.2 | 0.7 | 1.0 | 1.0 | 1.0 | - | - | - | - | 1.0 | 1.0 | 0.5 | 0.5 | 0.5 | 0.5 | 0.5 | 0.5 | -3.6 | -3.0 |
| | level | +1 | +1 | +1 | -1 | -1 | -1 | -1 | -1 | - | - | - | - | -1 | -1 | -1 | -1 | -1 | -1 | -1 | -1 | | |
| | Weight index * level | 0.2 | 0.2 | 0.2 | -0.2 | -0.7 | -1 | -1 | -1 | - | - | - | - | -1 | -1 | -0.5 | -0.5 | -0.5 | -0.5 | -0.5 | -0.5 | | |
| (E) | Weight index NRZI data train | 0.3 | 0.4 | 0.5 | 0.6 | 0.7 | 0.8 | 0.9 | 1.0 | - | - | - | - | 1.0 | 0.9 | 0.8 | 0.7 | 0.6 | 0.5 | 0.4 | 0.3 | -1.6 | 1.4 |
| | level | -1 | -1 | -1 | +1 | +1 | +1 | -1 | -1 | - | - | - | - | -1 | -1 | -1 | -1 | +1 | +1 | +1 | +1 | | |
| | Weight index * level | -0.3 | -0.4 | -0.5 | 0.6 | 0.7 | 0.8 | -0.9 | -1 | - | - | - | - | -1 | -0.9 | -0.8 | -0.7 | 0.6 | 0.5 | 0.4 | 0.3 | | |
| (F) | Weight index NRZI data train | 0.3 | 0.4 | 0.5 | 0.6 | 0.7 | 0.8 | 0.9 | 1.0 | - | - | - | - | 1.0 | 0.9 | 0.8 | 0.7 | 0.6 | 0.5 | 0.4 | 0.3 | -0.2 | 1.4 |
| | level | +1 | +1 | +1 | +1 | +1 | +1 | -1 | -1 | - | - | - | - | -1 | -1 | -1 | -1 | +1 | +1 | +1 | +1 | | |
| | Weight index * level | 0.3 | 0.4 | 0.5 | 0.6 | 0.7 | 0.8 | -0.9 | -1 | - | - | - | - | -1 | -0.9 | -0.8 | -0.7 | 0.6 | 0.5 | 0.4 | 0.3 | | |

Examples of writing 3T mark (refer to 8T clocks before and after the 3T mark)

| | | Weight index | 0.2 | 0.3 | 0.6 | 0.6 | 0.8 | 0.8 | 1 | 1 | | | $\Sigma\binom{\text{Weight index}}{*\text{level}}$ | Modification value to Ttop |
|---|---|---|---|---|---|---|---|---|---|---|---|---|---|---|
| | | | +8 | +7 | +6 | +5 | +4 | +3 | +2 | +1 | 0 | 0 | | |
| (A) | Third 2T mark | NRZI data train level | 1 | 1 | -1 | 1 | 1 | 1 | -1 | 1 | - | - | -1.1 | 1.1 |
| (B) | Second 2T mark | NRZI data train level | -1 | -1 | -1 | -1 | 1 | 1 | -1 | -1 | - | - | -2.1 | 2.1 |
| (C) | First 2T mark | NRZI data train level | 1 | -1 | -1 | -1 | -1 | -1 | -1 | -1 | - | - | -4.9 | 4.9 |

METHOD AND APPARATUS FOR RECORDING INFORMATION ON OPTICAL RECORDING MEDIUM WITH COMPENSATION FOR THERMAL EFFECTS IN ULTRA-HIGH-DENSITY OPTICAL RECORDING AND REPRODUCING SYSTEM

BACKGROUND OF THE INVENTION

1. Field of the Invention

The present invention relates to a method and an apparatus for recording information on an optical recording medium used in writing fine record marks and space trains in the so-called ultra high density optical recording and reproducing system.

2. Description of the Related Art

High density optical recording and reproducing media using a blue-violet laser such as BD (Blu-ray Disc) and HD-DVD (High Density Digital Versatile Disc) systems are proposed and partly manufactured in recent years. In these media, the wavelength of a laser beam for recording and reproducing is shortened and the NA (numerical aperture) of an optical system is increased as compared with a conventional optical recording and reproducing system in order to increase storage capacity. Also shortening a minimum mark length in a modulation signal relatively to the diameter of a laser spot furthermore increases areal density. In these examples, the minimum mark length does not exceed the resolution limit of the optical system, though the minimum mark length is shortened relatively to the diameter of the laser spot. Fully using PRML (Partial Response Maximum Likelihood), however, a system in which a minimum mark length is almost equal to the resolution limit is proposed in a conventional medium. Furthermore, as described in Japanese Patent Laid-Open Publication No. 2003-6872, for example, a super-resolution optical recording and reproducing medium which is configured to be able to reproduce a minimum mark length exceeding the resolution limit of a reproduction optical system and a super resolution recording and reproducing system using the medium are proposed.

In the foregoing optical recording medium, it is possible to reproduce fine marks and blank trains by an advanced signal processing method such as PRML or by means of super-resolution reproducing power on the side of the recording medium. However, it is anyway necessary to precisely write the fine marks and blank trains correctly in the direction of a time base and the direction of a reflection level before reproduction.

The conventional optical recording medium adopts the so-called heat mode writing, by which the energy of a laser beam is converted to generate heat in writing. Thus, in writing record marks, the smaller the minimum marks and blanks are set relatively to the laser spot, the more effects an ambient thermal environment has. The ambient thermal environment is thermal effects, for example, occurring in marks and space trains before and after target mark (data). To compensate these effects, various write strategies are proposed since before.

In DVDs (MML/RL=400 nm/270 nm=1.48), for example, MML (minimum mark length) is closer to RL (resolution limit) as compared with CDs (compact disc; MML/RL=840 nm/433 nm=1.94), so that a method called recording compensation (adaptive control) is adopted.

The recording compensation is a method by which the length of a write pulse for writing a record mark is delicately controlled in accordance with a blank length just before the record mark even if the write pulses have an equal NRZI (non return to zero inverted) data length.

When the blank lengths just before a 3T mark (T represents a channel bit length), a minimum mark, are 3T and 6T, for example, the pulse length is modified rather short in the former and relatively rather long in the latter in writing the 3T mark. This method is inherited to the BDs (MML/RL=1.26). In the HD-DVDs (MML/RL=1.11) in which the minimum mark length becomes short relative to a spot length, it is allowed to modify a pulse form in writing the mark while taking a blank length just after the record mark in addition to the blank length just before it into consideration.

It becomes difficult, however, for a system with further smaller MML/RL to take the conventional recording compensation method. In the super-resolution recording and reproducing system with MML/RL<1 described above, the effects of the ambient thermal environment becomes more serious.

Figure 11:
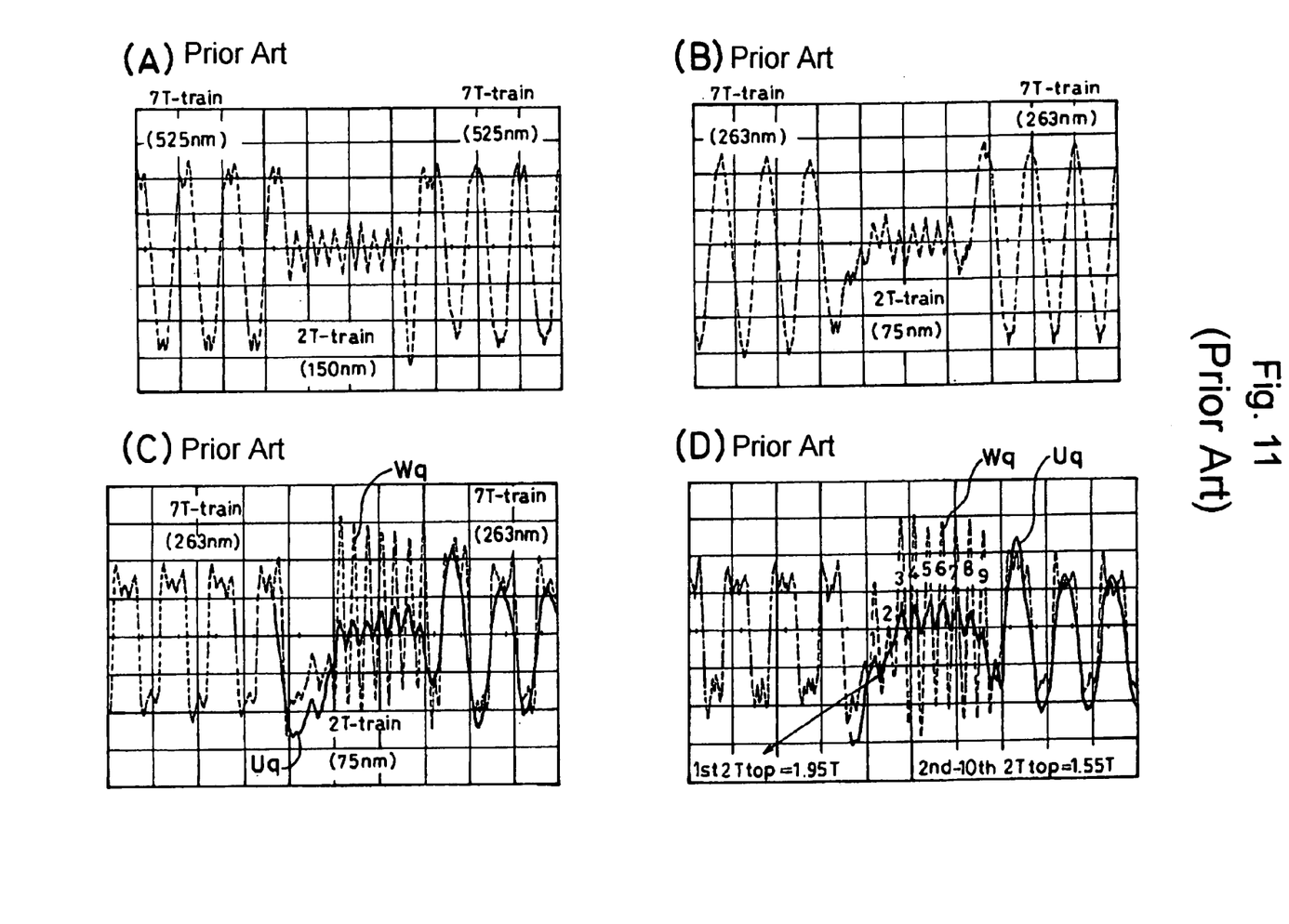
FIG. 11 includes graphs which show the waveforms of reflected light intensity in reproducing record marks with conventional recording compensation.

Referring to FIGS. 11(A) to (D) showing waveforms of reflected light intensity in reproduction, the relation between the minimum mark length (MML) and the RL (resolution limit) and the effects of ambient heat will be described with taking a case of a NRZI data train in which a train of 7T marks and 7T blanks and a train of 2T marks and 2T blanks are combined. FIG. 11(A) shows a waveform after passing through an EQ (equalizer) circuit of a commercially available BD-RE (Blu-ray disc rewritable) with MML=150 nm, RL=119 nm, and a channel bit length=75 nm. All 7T marks and blanks and 2T marks and blanks are written in the same pulse conditions, and the so-called recording compensation is not carried out. In this case, the waveform is proper without missing 2T and the like even if the recording compensation is not carried out.

FIG. 11(B) shows a reproduction waveform of a medium having the same NRZI data train as above, which can carry out super-resolution reproduction in conditions of MML=75 nm, RL=119 nm, and a channel bit length=37.5 nm. MML/RL=0.63 satisfies the condition of the so-called super-resolution reproduction. As for the polarity of a write waveform, low-to-high design in which a high level is set at a mark level and a low level is set at a blank level is adopted. When all 7T marks and blanks and 2T marks and blanks are written in the same pulse conditions, the first 2T mark and the second 2T mark after a rearmost 7T space have lower reflection levels than the other marks. It has been suggested that some recording compensation is necessary.

FIG. 11(C) shows waveforms of the same NRZI data pattern by the same optical recording medium as in FIG. 11(B) without recording compensation and with the slight modification of the write conditions of the 2T marks and blanks. In FIG. 11(C), Uq indicates a waveform of not passing the EQ circuit, and Wq indicates a waveform after passing a Limit-EQ circuit. As in the case of FIG. 11(B), the reflection levels of the first and second 2T marks after 7T are low, and it is difficult to decide the level.

FIG. 11(D) shows waveforms with the exactly same conditions as FIG. 11(C) adopting a conventional recording compensation method, in which the rising edge of a write pulse length of only the first 2T mark after the 7T train is shifted forward to elongate the pulse length. The reflection level of the first 2T mark is the almost same as the third or later 2T mark levels and hence is improved. Thus, it is not allowed to elongate the write pulse anymore. The second 2T mark, however, is still hard to decide the level. This means that the 7T space affects both of the first 2T mark and the second 2T mark, and the conventional recording compensation method which refers only to a blank just before the 2T mark is not enough for high density recording.

The super-resolution recording and reproducing medium is took as an example here, but the exactly same things have been confirmed in both of the case of using the combination of the conventional medium and PRML reproduction technology and the case of shortening the minimum mark and space in the modification signal relatively to the RL than ever before.

A method is conceivable as the extension of the conventional recording compensation method, which refers to further former marks in addition to the blanks just before and just after target data in writing the target data (mark). However, since the number of combination increases, huge buffer memory and a large processing circuit become necessary, so that there are great disadvantages in processing speed and costs. Also optimizations have to be carried out for the respective combinations. Therefore, there are problems that the method is very complicated and cannot quickly respond to various external perturbations.

SUMMARY OF THE INVENTION

In view of the foregoing problems, various exemplary embodiments of this invention provide a method and an apparatus for recording information on an optical recording medium which can precisely write a fine data train by easily compensating thermal effects occurring in data trains forward and backward without providing a large buffer memory and a processing circuit for processing signals from the forward and backward data trains, when a minimum mark/blank length becomes quite small with respect to the diameter of a light spot or a resolution limit and a conventional recording compensation method is not available anymore.

As a result of diligent study, the inventor found a way to modify the form of a write pulse of a record mark with reference to NRZI data trains or write pulse trains forward and backward in forming ultra high density record mark/blank trains in a method for forming record marks by modulating a laser beam into one or a plurality of write pulses with one or a plurality of write powers in accordance with the length of target data (the ranges of the target data are set from the inversion of a NRZI data level to the next inversion thereof) to be recorded. According to the way, it is possible to easily compensate thermal effects occurring in writing record marks before and after the target data even in the case of a super-resolution optical recording medium in which the ratio between a minimum mark length and a resolution limit is less than 1.1, and further less than 1.

In summary, the above-described objectives are achieved by the following embodiments of the present invention.

(1) A method for recording information on an optical recording medium in which irradiating a laser beam, modulated into one or a plurality of write pulses with one or a plurality of write powers in accordance with target data to be written, onto a recording layer of the optical recording medium forms a record mark, the method comprising: modifying a target write pulse form corresponding to the target data with reference to a sum total $\Sigma f(a_i, b_i)$ of a function $f(a_i, b_i)$ satisfying $|f(a_p, b_p)| \geq |f(a_q, b_q)|$ and $p<q$, wherein i, p, and q are distance indexes in a unit of channel bit which become smaller with getting near to the target data, a is a binary value except for zero of each channel bit, b is a weight index assigned to each channel bit, f is a bivariate function with variables a and b, in a reference data train being at least one of data trains before and after the target data to be written.

Representing the data levels obtained per channel bit in the reference data train in binary means that a binary number except for zero is assigned in accordance with High (1) and Low (0) of the NRZI levels in the reference data train. In the present invention, the High level of NRZI is defined as a written section (mark) in which a write power is applied to the medium as a result of write operation, and the Low level is defined as a no-written section (space or blank) in which the write power is not applied as a result of write operation. As a specific example of representing the NRZI in binary, +1 may be assigned to the High level and −1 may be assigned to the Low level.

The weight index assigned to each channel bit is assigned in consideration of thermal effects while focusing on distance from the target data. The relation between the distance from the target data and the weight index depends on the writing principles and thermal conductivity of the medium, optical characteristics, a reproduction optical system, a function f described later, and the like, so that the weight index may be appropriately set in accordance with them.

The function $f(a_i, b_i)$ is a function of two variables of a binary value and the weight index described above. The absolute value thereof indicates the dimensions of the thermal effects which the write power applied or not applied to a channel bit i at a certain distance away from a target bit has in writing the target bit. The nearer the position of the channel bit is to the target data, the larger the thermal effects become. Thus, it is necessary to satisfy a condition that the absolute value of $f(a_p, b_p)$ nearer to the target data is equal to or more than the absolute value of $f(a_q, b_q)$ farther from the target data ($p<q$). When such a function $f(a_i, b_i)$ is, for example, $f(a_i, b_i)=a_i \times b_i$ or $f(a_i, b_i)=a_i \times \exp(b_i)$, the smaller i is, in other words, the nearer the channel bit is to the target bit, the larger the absolute value of the assigned weight index $b_i$ becomes. When the function $f(a_i, b_i)$ is $f(a_i, b_i)=a_i/b_i$ or $f(a_i, b_i)=a_i \times \exp(-b_i)$, on the other hand, the smaller i is, in other words, the nearer the channel bit is to the target bit, the smaller the absolute value of the assigned weight index $b_i$ becomes. i, p, and q are natural numbers in a unit of the channel bit, and are indexes indicating distance from the target data. An index +1 is assigned to a range of the first channel bit length adjoining to the target data, and an index +2 is assigned to a range of the next channel bit length.

(2) The method for recording information on an optical recording medium according to (1), wherein the write pulse form of the target data is modified in accordance with the sum total by increasing or decreasing an integrated value of power and time of the write pulse.

A value of the sum total described above in the reference data train has information to which the distance from the target data and the thermal effects on the target data are added. An amount of heat applied to the target data is controlled base on the information. The amount of heat applied to the target data is given by the integrated values of time and power at which a writing beam is emitted. Both of the write pulse length and the power in the target data are modified in accordance with the sum total to carry out write operation.

(3) The method for recording information on an optical recording medium according to (2), wherein a modification value on a write pulse length of the target data is decided on the basis of the sum total, and the write pulse length of the target data is increased or decreased.

As a method for controlling an amount of heat of the target data in accordance with the sum total, the pulse length is elongated or shortened.

(4) The method for recording information on an optical recording medium according to (2), wherein a modification value on a write power of the target data is decided on the basis of the sum total, and the write power of the target data is increased or decreased.

As a method for controlling an amount of heat of the target data in accordance with the sum total, the write power is increased or decreased.

(5) The method for recording information on an optical recording medium according to (1) or (4), wherein the length of the reference data train is constant.

(6) The method for recording information on an optical recording medium according to one of (1) or (4), wherein a total of the length of the reference data train and the length of the target data is constant.

As compared with a conventional recording compensation method in units of space lengths and mark lengths before and after the target data, the channel bit length is used as a unit and the reference data train has a certain length, and hence the burden of calculation processing is dramatically reduced. The length of the reference data train itself may be constant, or the sum total of the target data length and the reference data length may be constant.

(7) The method for recording information on an optical recording medium according to any one of (1) to (6), wherein the length of the reference data train is equal to or more than a channel bit length, and is equal to or less than a diameter of a laser spot on a surface of a recording film.

The lengths of the reference data trains extracted before and after the target data to be written are decided in consideration of the relation between the length of the resolution limit of the optical system and areal density. It is necessary to increase the number of restrained channel bits with increase in the areal density to enhance compensation ability, but it causes increase in an amount of memory and an amount of calculation in the system. These relations depend on a modulation method of the system, the writing principles and thermal conductivity of the recording medium, optical characteristics, and the like, but an effect from thermal history of an area equal to or more than the diameter of the laser spot on the surface of a recording film can be approximately ignored, has little burden of processing, and is balanced. The diameter of the laser spot is defined as $\lambda/NA$, when $\lambda$(nm) represents a write wavelength and NA represents a numerical aperture of an objective lens.

(8) The method for recording information on an optical recording medium according to any one of (1) to (3) and (5) to (7), wherein: when the length of the target data is mT (m is a natural number and T is the channel bit length), an initial value of the write pulse length in the target data is set and a forward modification pulse length and/or a backward modification pulse length are/is set in advance in accordance with the sum total in the reference data train before the target data and the sum total in the reference data train after the target data on an m basis; and a rising edge of the foremost write pulse in the target data is shifted forward or backward from the initial value by the forward modification pulse length corresponding to the sum total and/or a falling edge of the rearmost write pulse in the target data is shifted forward or backward from the initial value by the backward modification pulse length.

(9) The method for recording information on an optical recording medium according to any one of (1), (2), (4), and (7), wherein: when the length of the target data is mT (m is a natural number and T is the channel bit length), an initial value of a write power in the target data is set and a forward modification power and/or a backward modification power are/is set in advance in accordance with the sum total in the reference data train before the target data and the sum total in the reference data train after the target data on an m basis; and an initial power value of the foremost write pulse in the target data is increased or decreased by the forward modification power corresponding to the sum total and/or an initial power value of the rearmost write pulse in the target data is increased or decreased by the backward modification power.

(10) A method for recording information on an optical recording medium in which irradiating a laser beam, modulated into one or a plurality of write pulses with one or a plurality of write powers in accordance with target data to be written, onto a recording layer of the optical recording medium forms a record mark, the method comprising: setting a reference data train in at least one of data trains before and after the target data to be written; and dividing the reference data train into a length equal to or less than a channel bit length at regular intervals, and modifying a target write pulse form corresponding to the target data with reference to a sum total $\Sigma f(d_j, e_j)$ of a function $f(d_j, e_j)$ which relates to a power level $d_j$ assigned from a write power set on a divided minimum unit basis and a weight index $e_j$ set on the minimum unit basis.

Precision is improved while reducing a unit dividing the reference data train, but an amount of calculation is increased. It depends on the medium to be written, but it is preferable that the unit is equal to or more than the time-resolution of the rise and fall of laser emission, is equal to or more than the time resolution of an IC directing the laser emission, and is equal to or less than the channel bit length.

After that, a write power set to each divided unit as described above or to be set thereto is assigned as a power level. The write power conventionally has 2 to 4 base values. When the write power has, for example, binary values 10 mW and 0.5 mW, it is preferable to assign binary values except for zero such as +20 and +1 in decreasing order of power so as to maintain the original ratio of the write power. In the case of 3 base values, for example, the write power has 10 mW, 3 mW, and 0.5 mW, in a like manner, it is preferable to assign 3 base values such as +20, +6, and +1 in decreasing order to the power levels so as to maintain the ratio of the write power. As to the weight index and the function f, as in the case of foregoing (1), it is preferable that f is a function calculating the product of the power level and the weight index. Then, the products calculated in each divided unit are totaled in the reference data train, and the write pulse form of the target data is modified with reference to a sum total value.

The other things follow the foregoing (1) to (9). Otherwise, (11) to (14) described later are applicable even if the reference data train is divided by a certain minimum unit instead of the channel bit and the sum total of the functions of the weight index and the power level is referred to, as in the case of (10).

(11) The method for recording information on an optical recording medium according to (10), wherein a method of modifying the write pulse form of the target data in accordance with the sum total is carried out by increasing or decreasing an integrated value of power and time of the write pulse.

(12) The method for recording information on an optical recording medium according to (10) or (11), wherein the length of the reference data train is constant.

(13) The method for recording information on an optical recording medium according to (10) or (11), wherein a total of the length of the reference data train and the length of the target data is constant.

(14) The method for recording information on an optical recording medium according to any one of (10) to (13), wherein the length of the reference data train is equal to or more than a channel bit length, and is equal to or less than a diameter of a laser spot on a surface of a recording film.

(15) An information recording apparatus for forming a record mark on an optical recording medium by irradiating a laser beam, modulated into one or a plurality of write pulses with one or a plurality of write powers in accordance with target data to be written, onto a recording layer of the optical recording medium, the apparatus comprising: a buffer memory for capturing at least one of forward and backward data trains before and after the target data as a reference data train; and a pulse form modification calculator for calculating a pulse form modification value in accordance with the sum total in the forward and backward data trains by using the method according to any one of claims 1 to 14, when a channel bit length is T and an initial pulse form is set on an mT, multiplying T by an integer m, basis, in order to modify an initial pulse form by the modification value calculated.

Since at least the weight index itself and the pulse modification value in accordance with the sum total of the products of the data level of each channel bit or the power level of each minimum unit divided into a length equal to or less than the channel bit length and the weight index slightly vary from one optical recording medium to another and from one recording apparatus to another, it is preferable that they are stored in advance in a form of pre-data on an optical recording medium basis or in a memory of the recording apparatus. It is preferable that an apparatus provided with the foregoing information recording method has a logical function which carries out trial writing of a certain pattern based on an initial value provided in the medium or the apparatus in advance to obtain values of jitter and the like, and then repeats trials and errors with the weight indexes varied in a certain range until obtaining the optimal jitter and the like.

According to the present invention, a degree of effects on write conditions on an optical recording medium with larger track recording density than ever before is efficiently obtained in consideration of distance from the target data and thermal effects by one or both of the reference data trains in the data trains before and after the target data. Therefore, it is possible to effectively and precisely compensate the thermal effects from surroundings on the target data without increasing the burden of processing.

BRIEF DESCRIPTION OF THE DRAWINGS

FIG. 3 is a timing chart which shows forward and backward data trains and weight indexes thereof which are referred to in carrying out recording compensation of a pulse length in writing the 5T mark according to the first embodiment;

DETAILED DESCRIPTION OF THE PREFERRED EMBODIMENTS

In a method for recording information on an optical recording medium according to preferred exemplary embodiments, when the length of write data is mT (m is a natural number, T is a channel bit length) an initial value of a write pulse form in target data is set on an m basis.

A data level is obtained on a channel bit length basis in data trains with constant channel bit lengths before and after data to be written. The data levels are represented in binary in such a manner that +1 is assigned to a High (1) level and −1 is assigned to a Low (0) level, and weight indexes are assigned to each channel bit in such a manner that the nearer the channel bit is to target data, the larger the weight index becomes. The product of the weight index and a binary value is calculated in each channel bit, and then the sum total of the products is obtained in each of a forward data train and a backward data train.

Tables for a forward modification value and a backward modification value with respect to the sum totals in the forward and backward data trains are set in advance on an m basis.

The modification values in the tables are set in such a manner that an amount of heat applied to the target data is increased or decreased in accordance with the sum total. A write power, a write pulse length, or both of them may be modified as long as the amount of heat is increased or decreased. A modification method by the write pulse length will be described because the write pulse length is easily controlled by current equipment.

According to the most effective method, a rising edge of the foremost write pulse in the target data is shifted forward or backward from an initial value by a forward modification pulse length corresponding to the calculated forward sum total, and a falling edge of the rearmost write pulse in the target data is shifted forward or backward from an initial value by a backward modification pulse length corresponding to the backward sum total.

First Exemplary Embodiment

An information recording apparatus 10 for carrying out a method for recording information on an optical recording medium according to a first exemplary embodiment of the present invention will be first described in detail with reference to FIGS. 1 to 7.

Figure 1:
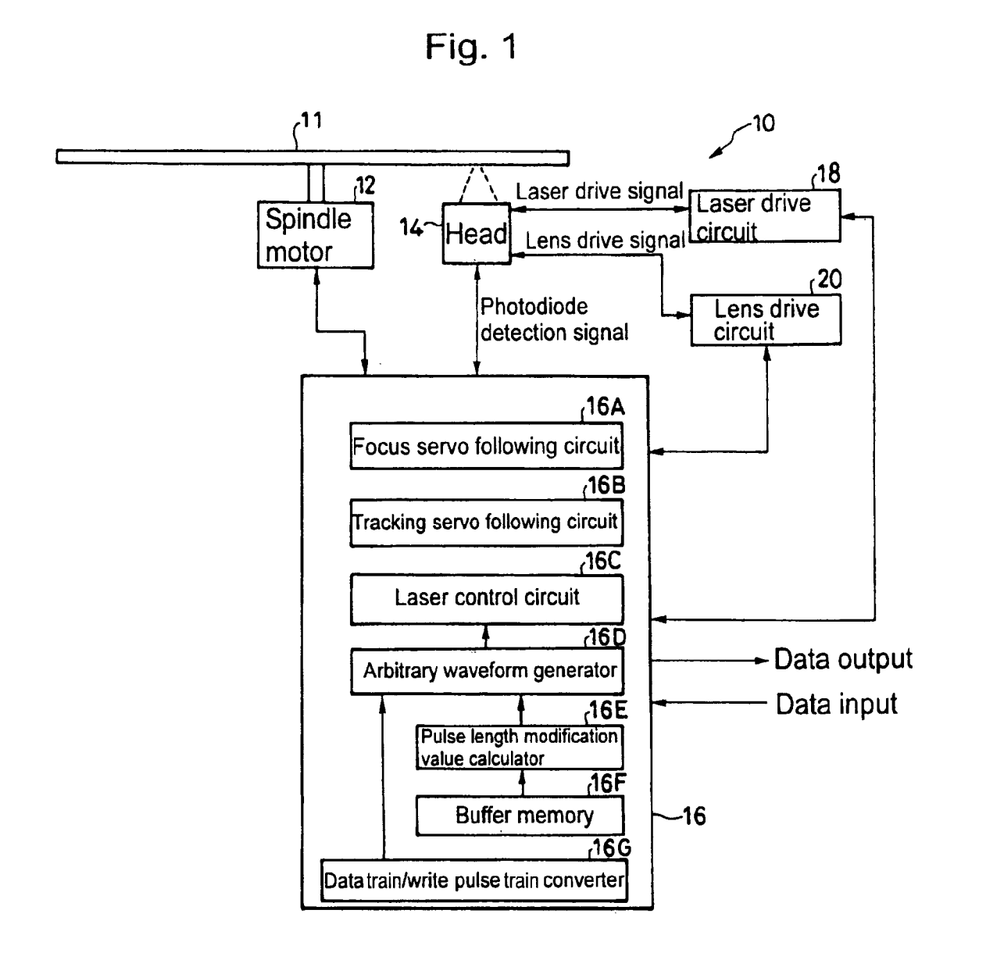
FIG. 1 is a block diagram schematically showing an optical recording apparatus which carries out a method for recording information on an optical recording medium according to exemplary embodiments of the present invention.

As the information recording apparatus 10, for example, DDU-1000 manufactured at Pulstec Industrial Co., Ltd. is used. The wavelength of a laser beam for write is 405 nm, and the NA of an optical system is 0.85.

The information recording apparatus 10 is configured to include: a spindle motor 12 which rotates an optical recording medium 11; a head 14 which projects the laser beam onto the optical recording medium 11; a controller 16 which controls the head 14 and the spindle motor 12; a laser drive circuit 18 which provides a laser drive signal for modulating the laser beam from the head 14 into a pulse train with a plurality of power levels; and a lens drive circuit 20 which supplies the head 14 with a lens drive signal.

The controller 16 includes a focus servo following circuit 16A, a tracking servo following circuit 16B, a laser control circuit 16C, an arbitrary waveform generator 16D, a pulse length modification value calculator 16E, a buffer memory 16F, and a data train/write pulse train converter 16G.

The laser control circuit 16C generates a laser drive signal provided by the laser drive circuit 18. The arbitrary waveform generator 16D composed of, for example, an arbitrary waveform generator AWG710 manufactured at Tektronix, Inc. generates an input signal to the laser control circuit 16C.

When recording compensation as described in this exemplary embodiment is not carried out, input NRZI data is converted into an initial write pulse signal at the data train/write pulse train converter 16G by using a software. The initial write pulse signal is input into the arbitrary waveform generator 16D.

When a recording compensation method according to the exemplary embodiment is carried out, though detail will be described later, the pulse length modification value calculator 16E calculates a pulse modification value, which is obtained by the sum total of the products of a binary value and a weight index of every channel bit of the data trains before and after the target data, by using software. The initial write pulse signal, which is generated from the input NRZI data train and is input through the data train/write pulse train converter 16G, is modified by adding the modification value calculated by the pulse length modification value calculator 16E in the arbitrary waveform generator 16D. Thus, a recording-compensated write pulse train is input into the laser control circuit 16C.

Figure 2:
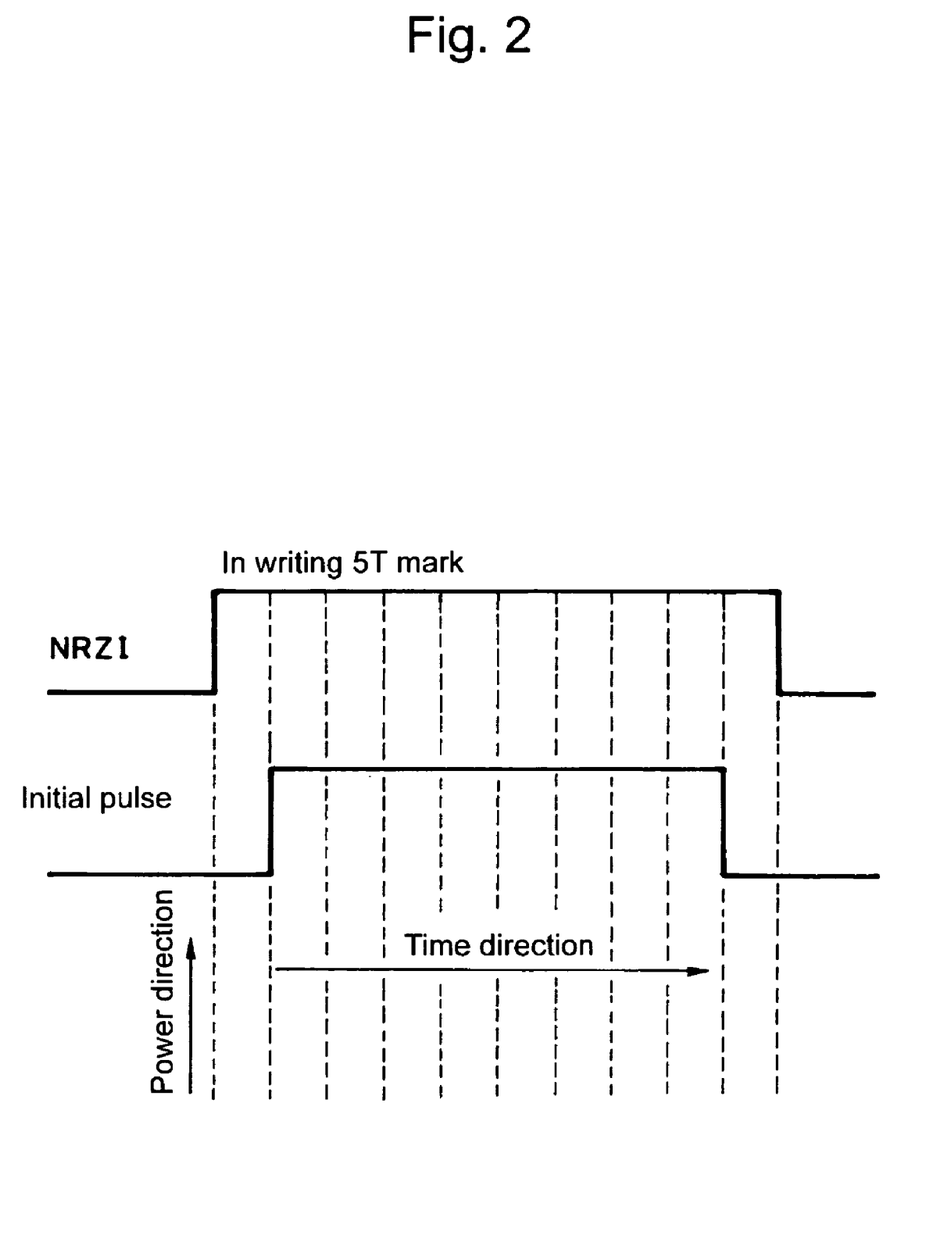
FIG. 2 is a timing chart showing an example of the basic forms of 5T NRZI data and a write pulse in writing a 5T mark according to a first exemplary embodiment.

To be more specific, in the method of recording information on the optical recording medium according to the first exemplary embodiment, when a channel bit length is set at T and an integral multiple of T nT, for example, 5T mark (double the length from a dotted line to the next dotted line represents one channel bit length) shown in the upper train of FIG. 2 is written, an initial pulse length being a basic pulse form is set at (n−1)T, namely, 4T as shown in the lower train of FIG. 2 with respect to the input NRZI data. A forward modification value and a backward modification value are calculated using a forward constant length reference data train and a backward constant length reference data train as reference data, and a rising edge and a falling edge are shifted forward or backward.

The length of the constant length reference data train is decided in consideration of the specifications of the recording medium, a modulation method of a system, the diameter of a spot, and a track recording density. Using a (1, 7) RLL ((1, 7) run length limited) coding method, the length of a channel bit is set at 37.5 nm, and the length of the reference data train is set at 8T (=300 nm). The length of the reference data train is shorter than the diameter of a laser spot (405/0.85=476 nm) on a surface of a recording film.

To be more specific, forward and backward NRZI data trains which are referred to are captured from the input NRZI data train into the buffer memory 16F. Using the data trains as the reference data trains, the pulse length modification value calculator 16E calculates the pulse modification value on the basis of the method of the exemplary embodiment.

FIG. 3 shows examples of the NRZI data train which includes target data corresponding to a target write pulse of the 5T mark and 8T reference data before and after the target data.

Referring to FIG. 3(A) and (B), in the forward and backward data trains being the reference data, a High level (1) is set at a positive (+1) and a Low level (0) is set at a negative (−1) on a channel bit basis. Thus, a level represented by +1 and −1 indicates the forward and backward data trains. As weight indexes, 1.0 is set at forward 4T clocks (channel bits +1 to +4), 0.5 is set at further forward 4T clocks (channel bits +5 to +8) and backward 4T clocks (channel bits +1 to +4), and 0.25 is set at further backward 4T clocks (channel bits +5 to +8).

The weight indexes are set in the pulse length modification value calculator 16E in advance. The pulse length modification value calculator 16E calculates the product of the weight index and the level of every channel bit in the 8T forward and 8T backward data trains being the reference data. The pulse length modification calculator 16E also calculates the sum total of the calculated products of the weight index and the level in the forward data train and the sum total of the products of the weight index and the level in the backward data train, and calculates a forward modification value and a backward modification value on the basis of the sum total values.

In the case of FIG. 3(A), the sum total of the products of the weight index and the level in the forward data train is −1. Then, the rising edge of a pulse writing the target data is shifted only by a length corresponding to the sum total value −1. In a like manner, the sum total of the products of the weight index and the level is −3 in the backward data train, so that the falling edge of the write pulse of the target data is shifted in accordance with it.

Specific forward modification values (modification pulse lengths) and backward modification values (modification pulse lengths) corresponding to the forward sum total values and backward sum total values are provided in a table in advance as shown in, for example, Table 1. The table is stored in the pulse length modification value calculator 16E.

TABLE 1

| | Forward sum Total (Σ (weight index * level)) | Forward Modification pulse length (T) | Backward sum total (Σ (weight index * level)) | Backward Modification pulse length (T) |
|---|---|---|---|---|
| | −8.0 | 0.50 | −8.0 | 0.50 |
| | −7.5 | 0.47 | −7.5 | 0.47 |
| | −7.0 | 0.44 | −7.0 | 0.44 |
| | −6.5 | 0.41 | −6.5 | 0.41 |
| | −6.0 | 0.38 | −6.0 | 0.38 |
| | −5.5 | 0.34 | −5.5 | 0.34 |
| | −5.0 | 0.31 | −5.0 | 0.31 |
| | −4.5 | 0.28 | −4.5 | 0.28 |
| | −4.0 | 0.25 | −4.0 | 0.25 |
| | −3.5 | 0.22 | −3.5 | 0.22 |
| | −3.0 | 0.19 | −3.0 | 0.19 |
| | −2.5 | 0.16 | −2.5 | 0.16 |
| | −2.0 | 0.13 | −2.0 | 0.13 |
| | −1.5 | 0.09 | −1.5 | 0.09 |
| | −1.0 | 0.06 | −1.0 | 0.06 |
| | −0.5 | 0.03 | −0.5 | 0.03 |
| Initial value | 0 | 0.00 | 0 | 0.00 |
| | +0.5 | −0.03 | +0.5 | −0.03 |
| | +1.0 | −0.06 | +1.0 | −0.06 |
| | +1.5 | −0.09 | +1.5 | −0.09 |
| | +2.0 | −0.13 | +2.0 | −0.13 |
| | +2.5 | −0.16 | +2.5 | −0.16 |
| | +3.0 | −0.19 | +3.0 | −0.19 |
| | +3.5 | −0.22 | +3.5 | −0.22 |

TABLE 1-continued

| Forward sum Total (Σ (weight index * level)) | Forward Modification pulse length (T) | Backward sum total (Σ (weight index * level)) | Backward Modification pulse length (T) |
|---|---|---|---|
| +4.0 | −0.25 | +4.0 | −0.25 |
| +4.5 | −0.28 | +4.5 | −0.28 |
| +5.0 | −0.31 | +5.0 | −0.31 |
| +5.5 | −0.34 | +5.5 | −0.34 |
| +6.0 | −0.38 | +6.0 | −0.38 |
| +6.5 | −0.41 | +6.5 | −0.41 |
| +7.0 | −0.44 | +7.0 | −0.44 |
| +7.5 | −0.47 | +7.5 | −0.47 |
| +8.0 | −0.50 | +8.0 | −0.50 |

In this table, the relation between the forward and backward sum total values and the forward and backward modification values (modification pulse lengths) is that the latter is approximately 1/16 of the former.

According to the table 1, the forward modification pulse length based on the forward sum total value −1 is 0.06T, and the backward modification pulse length based on the backward sum total value −3 is 0.19T.

With respect to the basic pulse form (initial pulse length=4T) shown in the lower train of FIG. 2 and FIG. 4(A), the rising edge of the pulse is shifted forward by the forward modification pulse length 0.06T and the falling edge of the pulse is shifted backward by the backward modification pulse length 0.19T as shown in FIG. 4(B) to carry out the recording compensation of a pulse length. FIG. 4(C) shows a case in which the forward modification pulse length is −0.25T and the backward modification pulse length is −0.2T.

In FIG. 3(A) and (B), the weight index is 1.0 in a range of the channel bits +1 to +4 and the weight index is 0.5 in a range of the channel bits +5 to +8 in the forward data train. In the backward data train, the weight index is 0.5 in a range of the channel bits +1 to +4 and the weight index is 0.25 in a range of the channel bits +5 to +8.

FIG. 3(C) to (F) shows examples in which a mark length to be written is 5T in accordance with data to be written and a forward 8T data train and a backward 8T data train are referred to, as in the case of FIG. 3(A) and (B), but the distribution of the weight indexes forward and backward is different from that of FIG. 3(A) and (B).

In a like manner, FIG. 5(A) to (F) shows examples of the different distribution of the weight indexes in writing a 3T mark. Also in this case, a forward 8T data train and a backward 8T data train are referred to.

Furthermore, FIG. 6(A) to (F) shows examples of the different distribution of the weight indexes in the case of writing a 2T mark and referring to a forward 8T clock data train and a backward 8T data train.

In the exemplary embodiment, by the sum total of the products of the weight indexes varying in the forward and backward 8T data trains and the levels of +1 or −1, the information of an amount of heat in writing before and after the target write pulse is converted into the forward modification pulse length and the backward modification pulse length. The rising edge and the falling edge of the target write pulse are shifted on the basis of the forward and backward modification pulse lengths, so that it is possible to precisely carry out the recording compensation of the pulse length.

In the foregoing exemplary embodiment, the pulse length of the target write pulse is compensated with reference to the 8T data trains before and after the target write pulse, but the present invention can be applied to a case where the reference length is changeable in a range equal to or less than the diameter of the laser spot in consideration of an amount of processing calculation, a coding method, and the writing principles, thermal conductivity, and optical characteristics of the medium.

Figure 4:
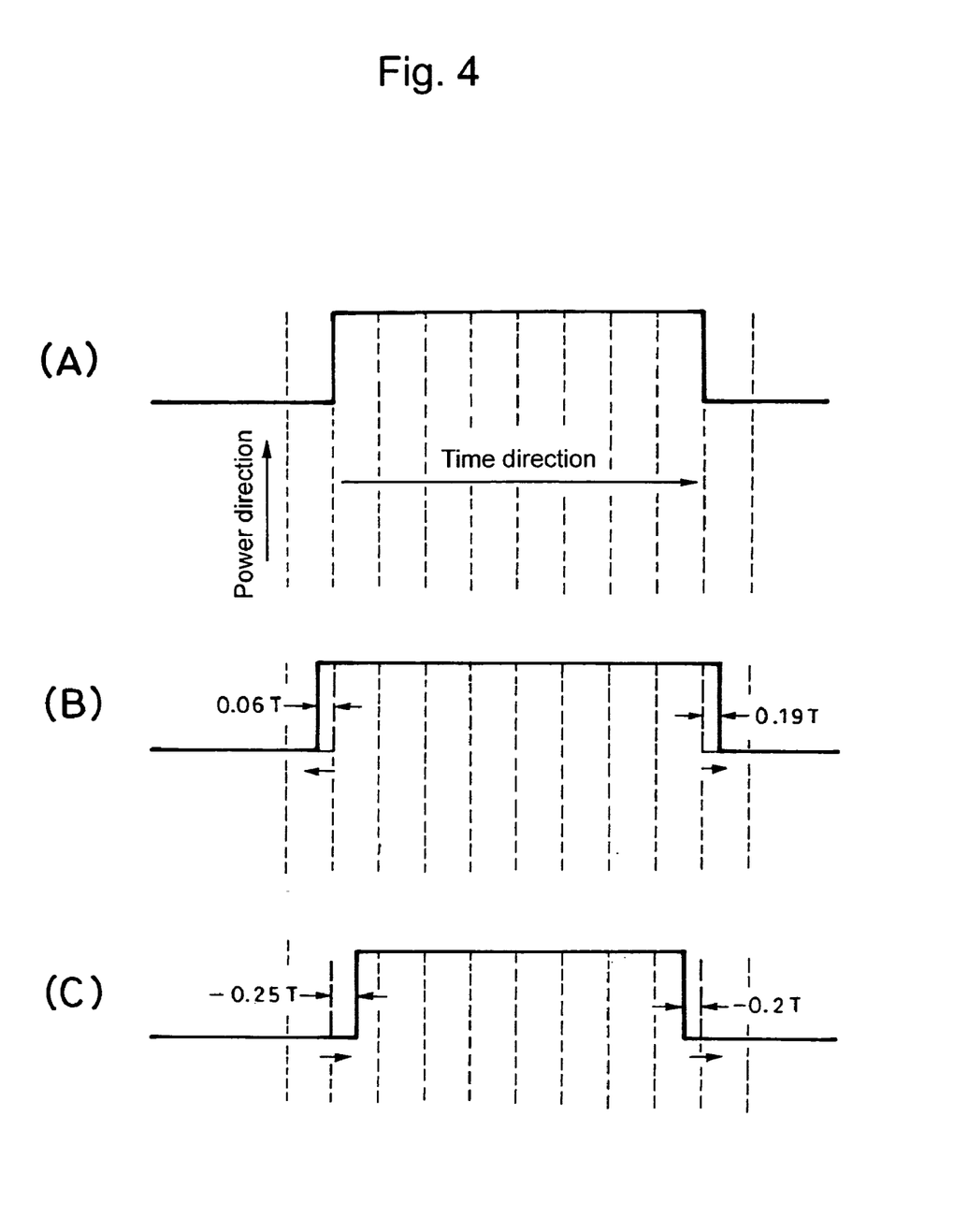
FIG. 4 is a timing chart showing states in which the basic pulse form is modified by forward and backward pulse lengths calculated with reference to the foregoing data trains.
Figure 5:
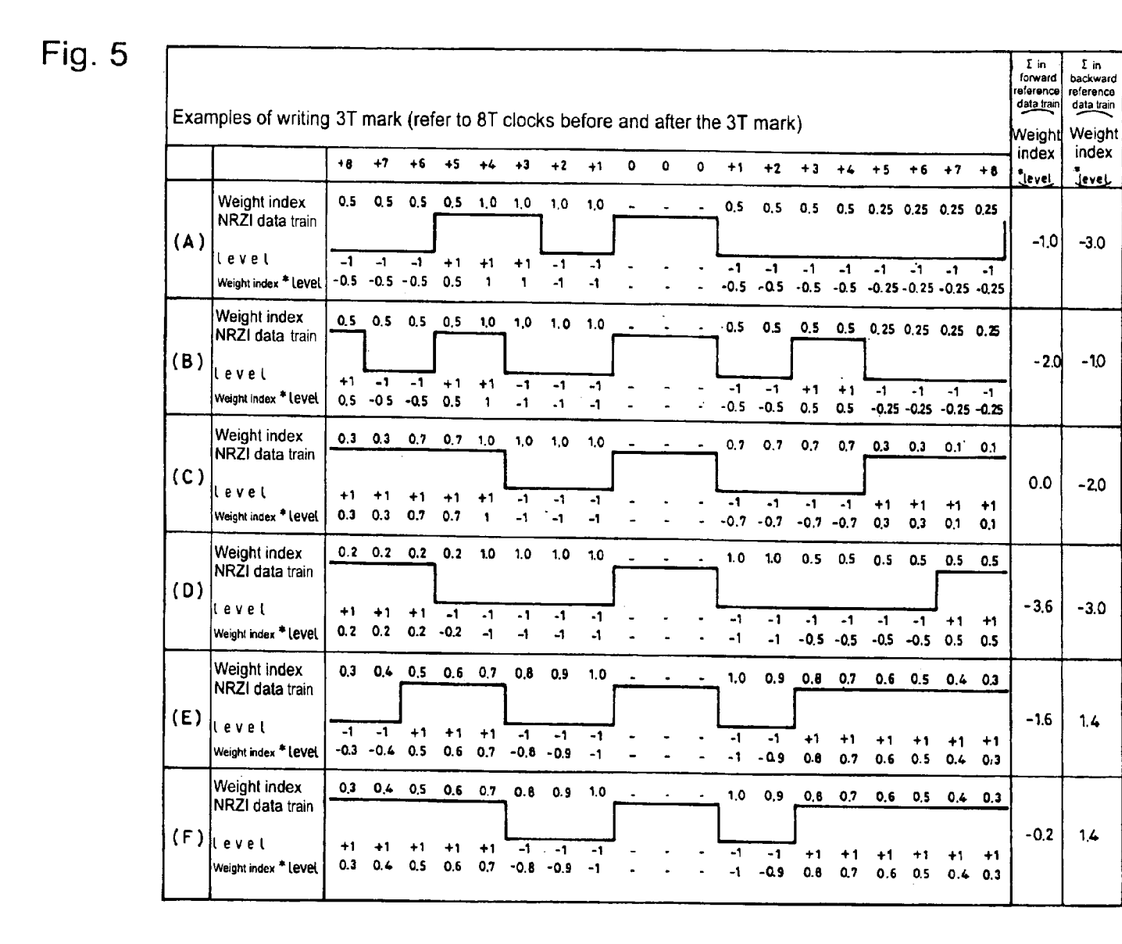
FIG. 5 is a timing chart which shows the relations between data trains and the distribution of weight indexes in cases where a record mark written by a target write pulse is 3T.
Figure 6:
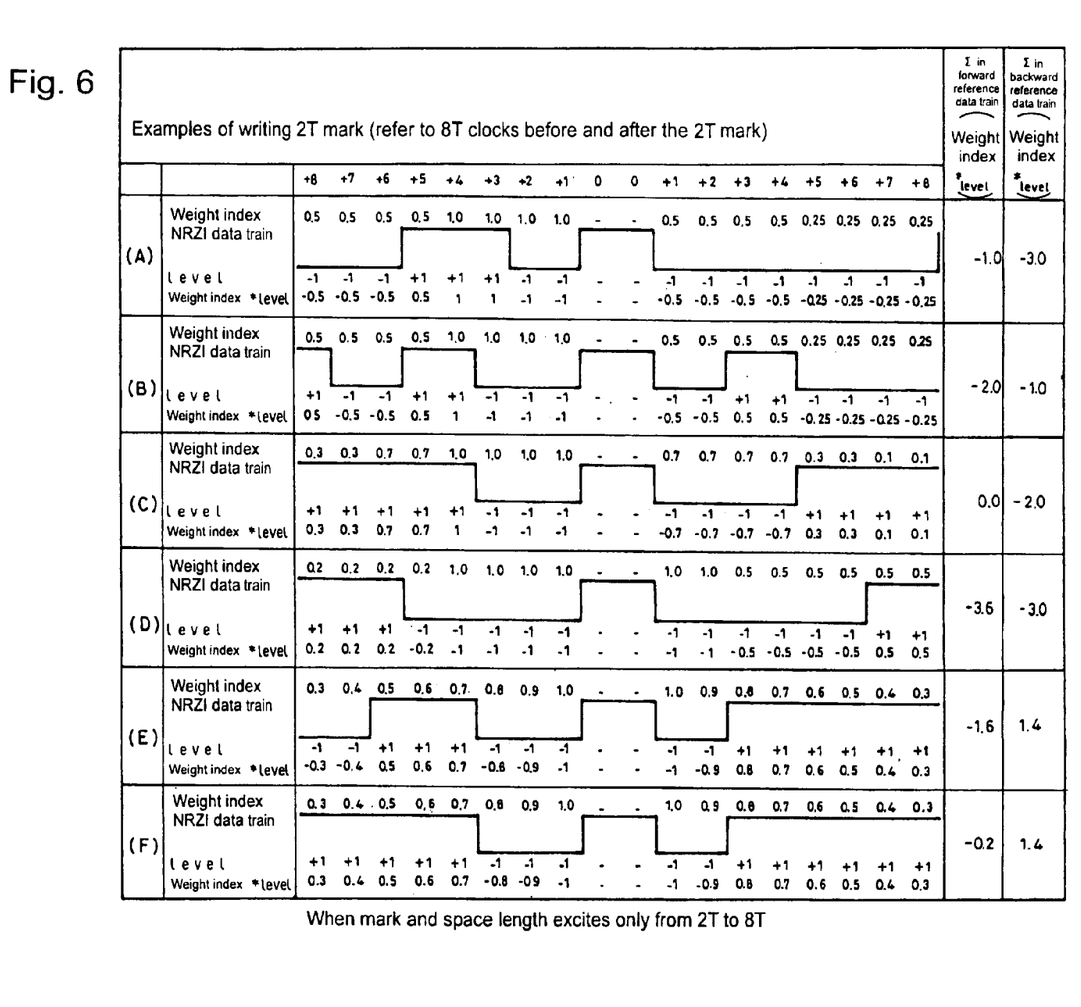
FIG. 6 is a timing chart similar to FIG. 5 in the cases of writing a 2T mark.
Figure 7:
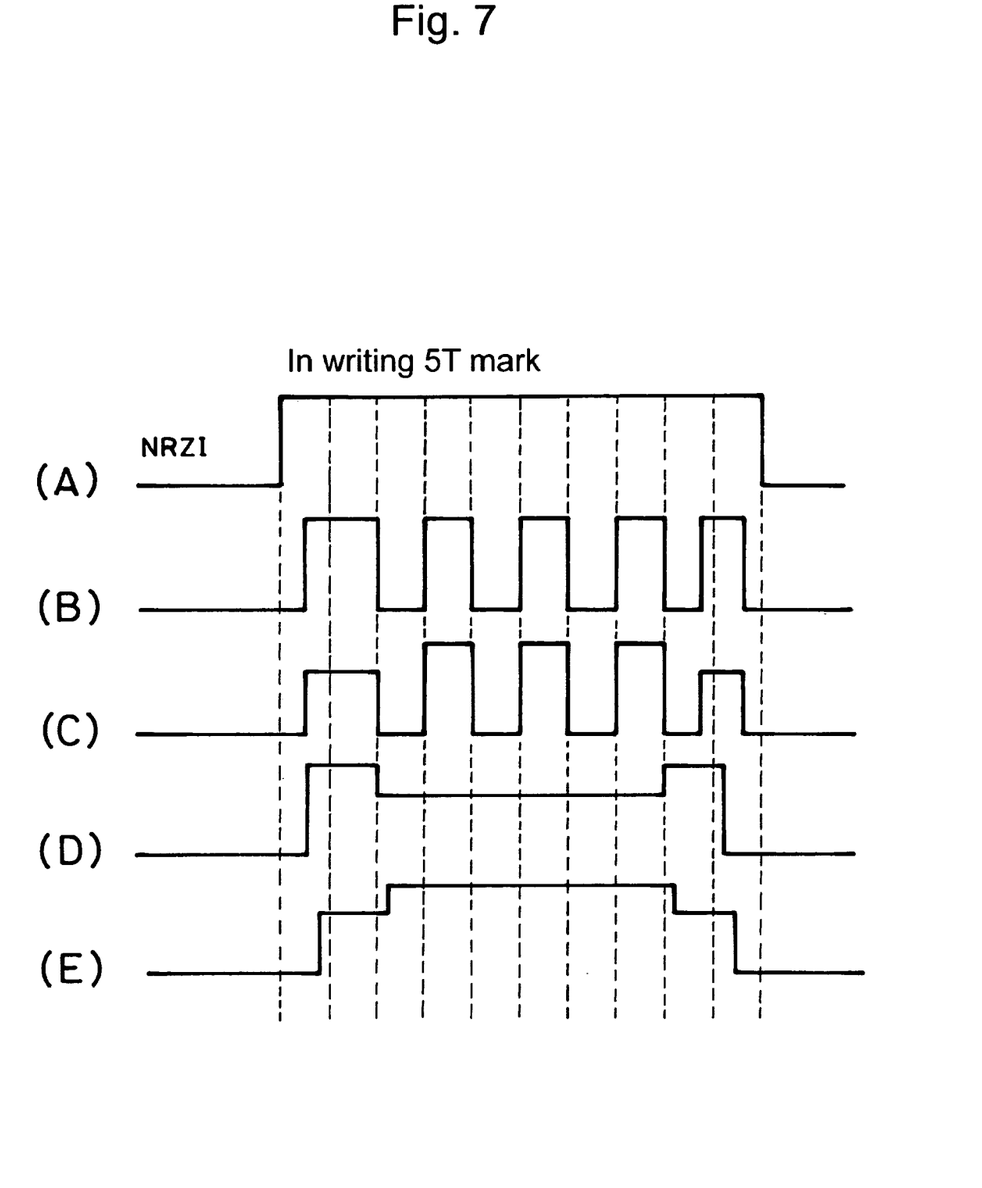
FIG. 7 is a timing chart showing different examples of the form of a basic pulse in writing a mark.

Furthermore, in the foregoing exemplary embodiment, the basic pulse form in writing a mark, as shown in FIG. 4, forms the record mark by a flat single pulse, but the present invention can be applied to a case where various pulse forms shown in, for example, FIG. 7(B) to (E) are taken when NRZI data of a 5T record mark shown in FIG. 7(A) is to be written.

In any pulse form, a basic pulse form (initial value) is given to every T mark, and the initial value is modified with a forward modification pulse length and a backward modification pulse length calculated from weight indexes and NRZI levels.

In the case of modifying the pulse forms divided by a pulse period as shown in FIG. 7(B) to (E), forward modification may modify the rising edge of the front pulse and shorten or elongate the front pulse. Backward modification may modify only the rearmost pulse.

Also in the foregoing exemplary embodiment, both of the forward and backward data trains are referred to, but it may be possible to refer to only the forward data train. Furthermore, the lengths of the forward data train and the backward data train to be referred to may not be the same.

Second Exemplary Embodiment

An apparatus identical to that of the first exemplary embodiment is used, and an optical recording medium which can carry out super-resolution reproduction is used. An input NRZI data train is a repeat signal of ten combinations of a 7T mark and a 7T blank (7T train) and ten combinations of a 2T mark and a 2T blank (2T train) following thereto. A channel bit length (=T) is 37.5 nm, and hence 2T is 75 nm. RL of an optical system is 119 nm. Thus, when the 2T mark is set at a minimum mark, MML/RL=0.63 satisfies an ultra high density recording condition. As a modulation method, RLL(1, 7) in which 8T is set at a longest mark is assumed. Write polarity is low-to-high, and a High level of a signal waveform corresponds to the mark level. At this time, evaluation is carried out with focusing attention on a 2T section continued from the 7T train in the input NRZI data train with reference to a forward 8T channel bit length as forward reference. The 2T mark is written by a single power level and a single pulse, and an initial pulse length is 1.43T. This length of the mark corresponds to the length of 2T pulses at which CNR becomes approximately maximum at a power of 9 mW in a 2T single mark/space train.

Figure 8:
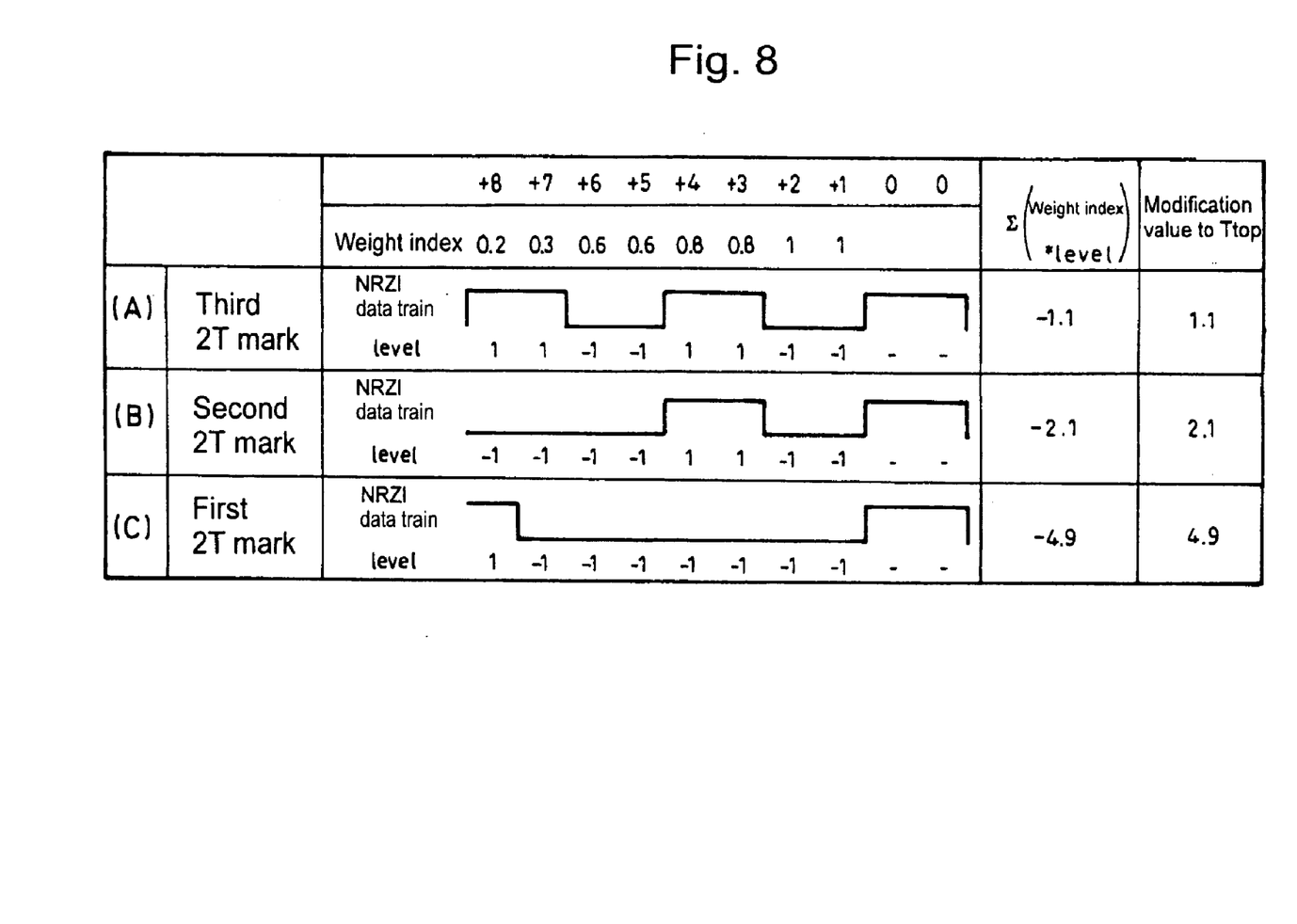
FIG. 8 is a timing chart similar to FIG. 5 in the case of writing a 2T mark according to a second exemplary embodiment of the present invention.

FIG. 8(C) is a forward 8T NRZI data train when the 2T mark at the front of the 2T train is set as a target data. In a like manner, FIG. 8(B) is a forward 8T NRZI data train when the 2T mark at the second of the 2T train is set as the target data. FIG. 8(A) is a forward 8T NRZI data train when the 2T mark at the third of the 2T train is set as the target data.

The farther distance from the target data, the smaller a weight index is set. As the relation between the sum total of products of the weight index and a level and a modification value to the 2T pulse length, when an 8T space is in front of the target data, the 2T pulse length is set so as to be approximately equal to the length of 2T-NRZI. Table 2 shows this.

TABLE 2

Conversion table of 2T

| Forward Σ (weight index * level) | Forward modification value (modification pulse length) (T) | Pulse length after modification (T) |
|---|---|---|
| −5.3 | 0.56 | 1.99 |
| −5.0 | 0.53 | 1.96 |
| −4.9 | 0.52 | 1.95 |
| −4.0 | 0.42 | 1.85 |
| −3.0 | 0.32 | 1.75 |
| −2.1 | 0.22 | 1.65 |
| −2.0 | 0.21 | 1.64 |
| −1.1 | 0.12 | 1.55 |
| −1.0 | 0.11 | 1.54 |
| 0.0 | 0.00 | 1.43 |
| 1.0 | −0.10 | 1.33 |
| 1.3 | −0.14 | 1.29 |

Setting the pulse length of the 2T mark on the basis of these set values, the first 2T mark is 1.95T, the second 2T mark is 1.65T, and the third 2T mark is 1.55T.

Figure 9:
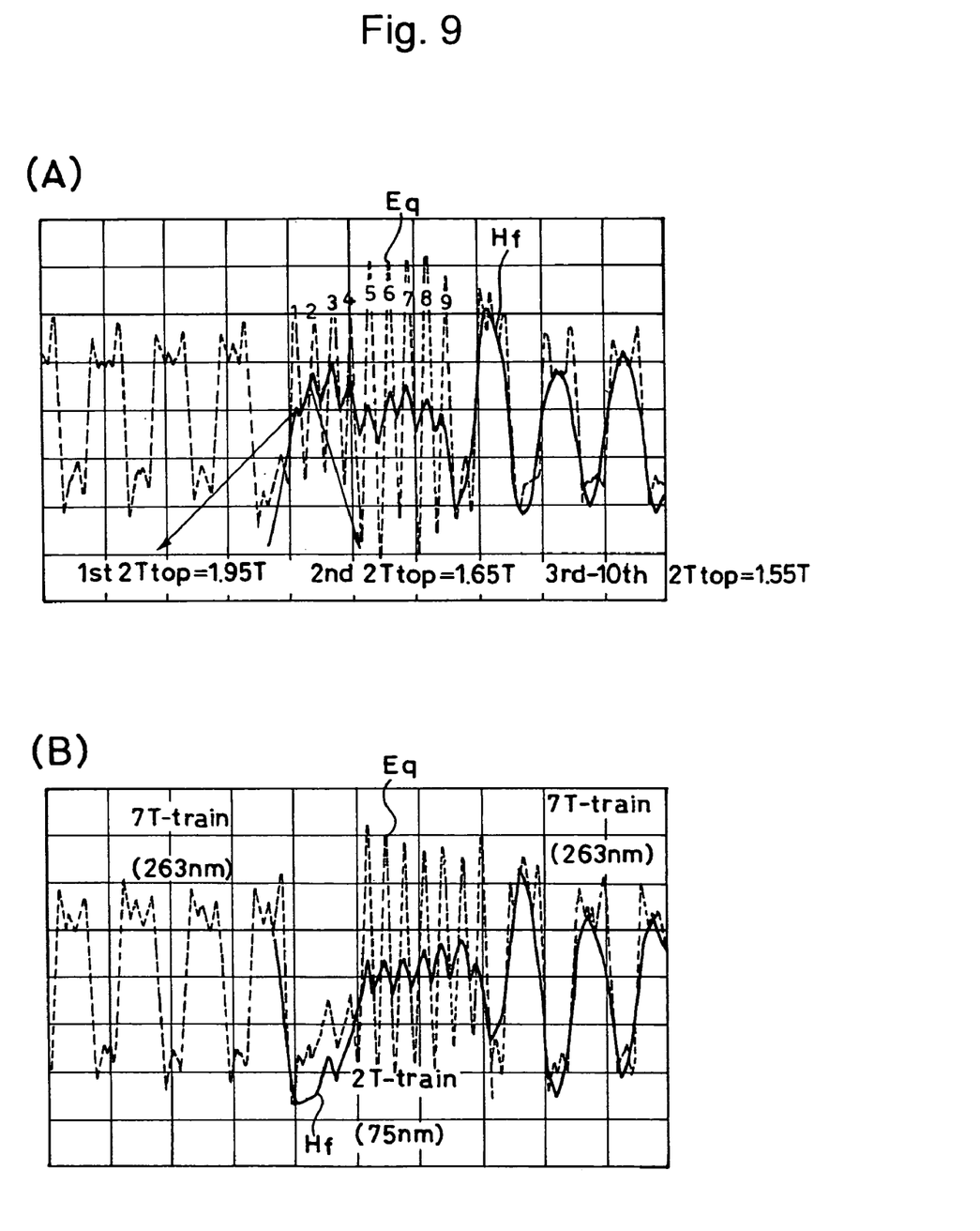
FIG. 9 includes graphs which shows a reproduction waveform with recording compensation in comparison with that without the recording compensation according to the second exemplary embodiment.

FIG. 9(A) shows an actual reproduction signal waveform Hf with the recording compensation and a waveform Eq after passing through Limit-EQ, and FIG. 9(B) shows waveforms without the recording compensation. The reflection levels of the first and second 2T marks are low and hence separation is difficult in FIG. 9(B), while significant improvement is achieved in FIG. 9(A).

Similar effect can be obtained by an information recording method being the extension of an ordinary recording compensation method, in which modification is carried out on an mT basis in accordance with each of the combinations of an initial pulse form and m kinds of immediately forward space lengths, the initial pulse form and m kinds of immediately forward mark lengths, the initial pulse form and m kinds of secondary forward space lengths, and the initial pulse form and m kinds of secondary forward mark lengths. The size of a file in which write condition information is stored becomes 50 times larger than that of a file in which write condition information by the recording compensation method used in the second exemplary embodiment is stored. Thus, it was found that the information recording method according to the present invention could carry out compensation extremely easily.

Third Exemplary Embodiment

Figure 10:
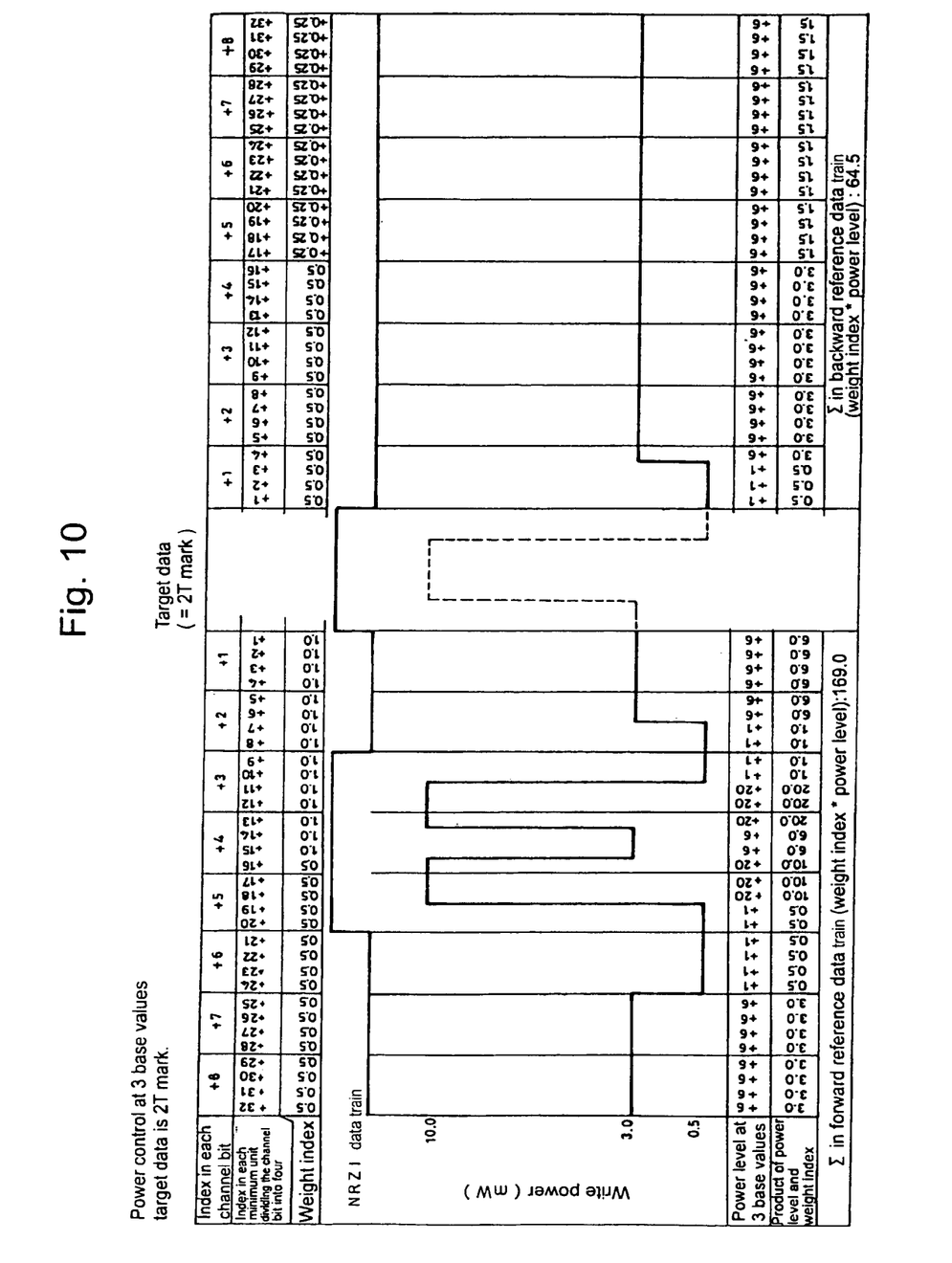
FIG. 10 is a timing chart similar to FIG. 6(A) in the case of writing a 2T mark according to a third exemplary embodiment of the present invention.

In each of the foregoing exemplary embodiments, the levels of data decided by the binary of the NRZI data train in the reference data train are used, but the present invention can be applied to other cases. For example, as shown in FIG. 10, at least one of data trains before or after target data to be written is divided into a constant length, and the data train is divided at regular intervals into a length equal to or less than a channel bit length. Write power levels set to each minimum unit may be used.

FIG. 10 shows an example in which writing is carried out by using base 3 power. The highest power is 10 mW, the middle power is 3 mW, and the lowest power is 0.5 mW. The length of reference data is 8T channel bit length. The channel bit length is further divided into four. This is a minimum unit (=0.25T), and a weight index and a base 3 power level (+20, +6, and +1) remaining the ratio of laser power are assigned to each unit. The most preferable method is that the product of the base 3 power level and the weight index is calculated on a minimum unit basis, and the sum total is calculated in the reference data train. Using the predetermined relation between the sum total and a modification pulse length, a write pulse form for writing the target data is modified to carry out recording compensation.

In this case, the smaller the divided unit is, the more precision in compensation is increased. However, an amount of calculation is increased. It is preferable that the unit is equal to or more than the time resolution of the rise and fall of laser emission, equal to or more than the time resolution of an IC directing the laser emission, and equal to or less than the channel bit length, though it depends on an optical recording medium to be written.

What is claimed is:

1. A method for recording information on an optical recording medium in which irradiating a laser beam, modulated into one or a plurality of write pulses with one or a plurality of write powers in accordance with target data to be written, onto a recording layer of the optical recording medium forms a record mark, the method comprising:
modifying a target write pulse form corresponding to the target data with reference to a sum total $\Sigma f(a_i, b_i)$ of a function $f(a_i, b_i)$ satisfying $|f(a_p, b_p)| \geq |f(a_q, b_q)|$ and $p<q$, wherein
i, p, and q are distance indexes in a unit of channel bit which become smaller with getting near to the target data,
a is a binary value except for zero of each channel bit,
b is a weight index assigned to each channel bit,
f is a bivariate function with variables a and b, in a reference data train being at least one of data trains before and after the target data to be written, wherein
the length of the reference data train is equal to or more than a channel bit length, and is equal to or less than a diameter of a laser spot on a surface of a recording film.

2. The method for recording information on an optical recording medium according to claim 1, wherein
the write pulse form of the target data is modified in accordance with the sum total by increasing or decreasing an integrated value of power and time of the write pulse.

3. The method for recording information on an optical recording medium according to claim 2, wherein
a modification value on a write pulse length of the target data is decided on the basis of the sum total, and the write pulse length of the target data is increased or decreased.

4. The method for recording information on an optical recording medium according to claim 2, wherein
a modification value on a write power of the target data is decided on the basis of the sum total, and the write power of the target data is increased or decreased.

5. The method for recording information on an optical recording medium according to claim 4, wherein
the length of the reference data train is constant.

6. The method for recording information on an optical recording medium according to claim 4, wherein
a total of the length of the reference data train and the length of the target data is constant.

7. The method for recording information on an optical recording medium according to claim 1, wherein
the length of the reference data train is constant.

8. The method for recording information on an optical recording medium according to claim 1, wherein
a total of the length of the reference data train and the length of the target data is constant.

9. The method for recording information on an optical recording medium according to claim 1, wherein
when the length of the target data is mT (m is a natural number and T is the channel bit length), an initial value of the write pulse length in the target data is set and a forward modification pulse length and/or a backward modification pulse length are/is set in advance in accordance with the sum total in the reference data train before the target data and the sum total in the reference data train after the target data on an m basis; and a rising edge of the foremost write pulse in the target data is shifted forward or backward from the initial value by the forward modification pulse length corresponding to the sum total and/or a falling edge of the rearmost write pulse in the target data is shifted forward or backward from the initial value by the backward modification pulse length.

10. The method for recording information on an optical recording medium according to claim 1, wherein:

when the length of the target data is mT (m is a natural number and T is the channel bit length), an initial value of a write power in the target data is set and a forward modification power and/or a backward modification power are/is set in advance in accordance with the sum total in the reference data train before the target data and the sum total in the reference data train after the target data on an m basis; and an initial power value of the foremost write pulse in the target data is increased or decreased by the forward modification power corresponding to the sum total and/or an initial power value of the rearmost write pulse in the target data is increased or decreased by the backward modification power.

11. An information recording apparatus for forming a record mark on an optical recording medium by irradiating a laser beam, modulated into one or a plurality of write pulses with one or a plurality of write powers in accordance with target data to be written, onto a recording layer of the optical recording medium, the apparatus comprising:

a buffer memory for capturing at least one of forward and backward data trains before and after the target data as a reference data train; and a pulse form modification calculator for calculating a pulse form modification value in accordance with the sum total in the forward and backward data trains by using the method according to claim 1, when a channel bit length is T and an initial pulse form is set on an mT, multiplying T by an integer m, basis, in order to modify an initial pulse form by the modification value calculated.

* * * * *